US012508816B2

(12) United States Patent
Matoba et al.

(10) Patent No.: US 12,508,816 B2
(45) Date of Patent: Dec. 30, 2025

(54) PRINTING APPARATUS

(71) Applicant: BROTHER KOGYO KABUSHIKI KAISHA, Nagoya (JP)

(72) Inventors: Kenji Matoba, Nagoya (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 183 days.

(21) Appl. No.: 18/315,948

(22) Filed: May 11, 2023

(65) Prior Publication Data

US 2023/0415479 A1 Dec. 28, 2023

(30) Foreign Application Priority Data

Jun. 23, 2022 (JP) ................................ 2022-100924

(51) Int. Cl.
*B41J 2/21* (2006.01)
*B41J 11/00* (2006.01)

(52) U.S. Cl.
CPC .......... *B41J 2/2132* (2013.01); *B41J 2/2114* (2013.01); *B41J 2/2117* (2013.01); *B41J 2/2121* (2013.01); *B41J 11/00214* (2021.01)

(58) Field of Classification Search
CPC ...... B41J 2/2132; B41J 2/2117; B41J 2/2121; B41J 11/00214
See application file for complete search history.

(56) References Cited

U.S. PATENT DOCUMENTS

2017/0050449 A1 2/2017 Keda et al.

FOREIGN PATENT DOCUMENTS

| | | | |
|---|---|---|---|
| CA | 2573625 | A1 * | 8/2006 |
| JP | 2001-239660 | A | 9/2001 |
| JP | 2015-214133 | A | 12/2015 |
| JP | 2018-1675 | A | 1/2018 |

* cited by examiner

*Primary Examiner* — Justin Seo
(74) *Attorney, Agent, or Firm* — Merchant & Gould P.C.

(57) ABSTRACT

A printing apparatus includes: a discharging head discharging, onto a print medium, at least one ink among a printing ink, a base layer ink and a protective layer ink; an obtaining section obtaining information regarding a shape of the print medium; and a controller. The controller executes an ink amount increasing processing by controlling a discharging operation of the discharging head so as to increase an amount per unit area of the at least one ink with respect to a ridge line present area including a ridge line as a boundary between one print surface and the other print surface which are adjacent to each other in the print medium than another area different from the ridge line present area, based on the information regarding the shape of the print medium obtained by the obtaining section.

7 Claims, 9 Drawing Sheets

PRINTING APPARATUS

REFERENCE TO RELATED APPLICATION

This application claims priority from Japanese Patent Application No. 2022-100924 filed on Jun. 23, 2022. The entire content of the priority application is incorporated herein by reference.

BACKGROUND ART

There is a conventionally known printing apparatus provided with: an undercoat agent-discharging head part configured to discharge, before an image is formed on a print medium, an undercoat agent which is to be applied to a surface of the print medium; and a topcoat agent-discharging head part configured to discharge a topcoat agent which is to be applied to the surface of the print medium after the image has been formed on the print medium. The undercoat agent is applied before a desired image is printed on the print medium by an ink discharging part. As the undercoat agent, a primer for improving the fixing property of the ink with respect to the print medium, an undercoat coloring agent such as a white paint, a white ink, etc., for forming a base (base coat) which conceals or hides the color of a material of the print medium, or a mixture of the primer and the undercoat coloring agent, etc. Further, the topcoat agent is applied after the desired image has been printed on the print medium by the ink discharging part. The top coat agent is used to form a transparent, water-resistant and weather-resistant coating film so as to protect the printed image.

In the above-described printing apparatus, the coating agent-discharging parts discharge, respectively, the coating agents with respect to a projected part in the surface of the print medium by a large amount as compared with a recessed part in the surface of the print medium. In the above-described printing apparatus, it is allowable that each of the undercoat agent-discharging part and the topcoat agent-discharging part changes a discharge amount of one of the undercoat agent and the topcoat agent, depending on an angle, with respect to a horizontal plane, of an inclined surface in the print medium.

DESCRIPTION

In view of the above situation, the printing is performed on an area, in the print medium, including a ridge line which is a boundary between one print surface and the other print surface which are adjacent to each other, in some cases. In the conventionally known technique, however, in a case that printing is performed on the area including the ridge line, there is also such a case that any blank part (void, a white patch on a printed sheet) appears in a printed image in the above-described area including the ridge line, due to any positional deviation in a landing position of a droplet of an ink (ink droplet). Therefore, there arises a case that the quality of the result of printing is lowered, and/or a case that a peeling of the ink by a contact made by the above-described area of the print medium with the outside.

In view of the above-described situation, an object of the present disclosure is to provide a printing apparatus capable of suppressing the occurrence of a blank part.

According to an aspect of the present disclosure, there is provided a printing apparatus including: a discharging head configured to discharge, onto a print medium, at least one ink among a printing ink of an ultraviolet curable type, a base layer ink for forming a base layer and a protective layer ink for forming a protective layer; an obtaining section configured to obtain information regarding a shape of the print medium; and a controller, wherein the controller is configured to execute an ink amount increasing processing by controlling a discharging operation of the discharging head so as to increase an amount per unit area of the at least one ink with respect to a ridge line present area including a ridge line as a boundary between one print surface and the other print surface which are adjacent to each other in the print medium than another area different from the ridge line present area, based on the information regarding the shape of the print medium obtained by the obtaining section.

According to the present disclosure, in the ink amount increasing processing, the amount per unit area of the at least one ink with respect to the ridge line present area is increased than the amount per the unit area of the at least one ink with respect to the another area different from the ridge line present area. Owing to this, it is possible to suppress or prevent the appearance of any blank part in a printed image in the ridge line present area, due to the positional deviation in the landing position of the ink droplet. With this, it is possible to improve the quality of the result of printing and further to suppress any peeling off of the ink by a contact made by the ridge line present area in the print medium with the outside.

According to the present disclosure, it is possible to provide a printing apparatus capable of suppressing the occurrence of the blank part.

In the following, a printing apparatus according to an embodiment of the present disclosure will be explained, with reference to the drawings. The printing apparatus to be explained below is merely an embodiment of the present disclosure. Accordingly, the present disclosure is not limited to or restricted by the following embodiment, and any addition, deletion and/or change is/are possible within a range not departing from the spirit of the present disclosure.

Figure 1:
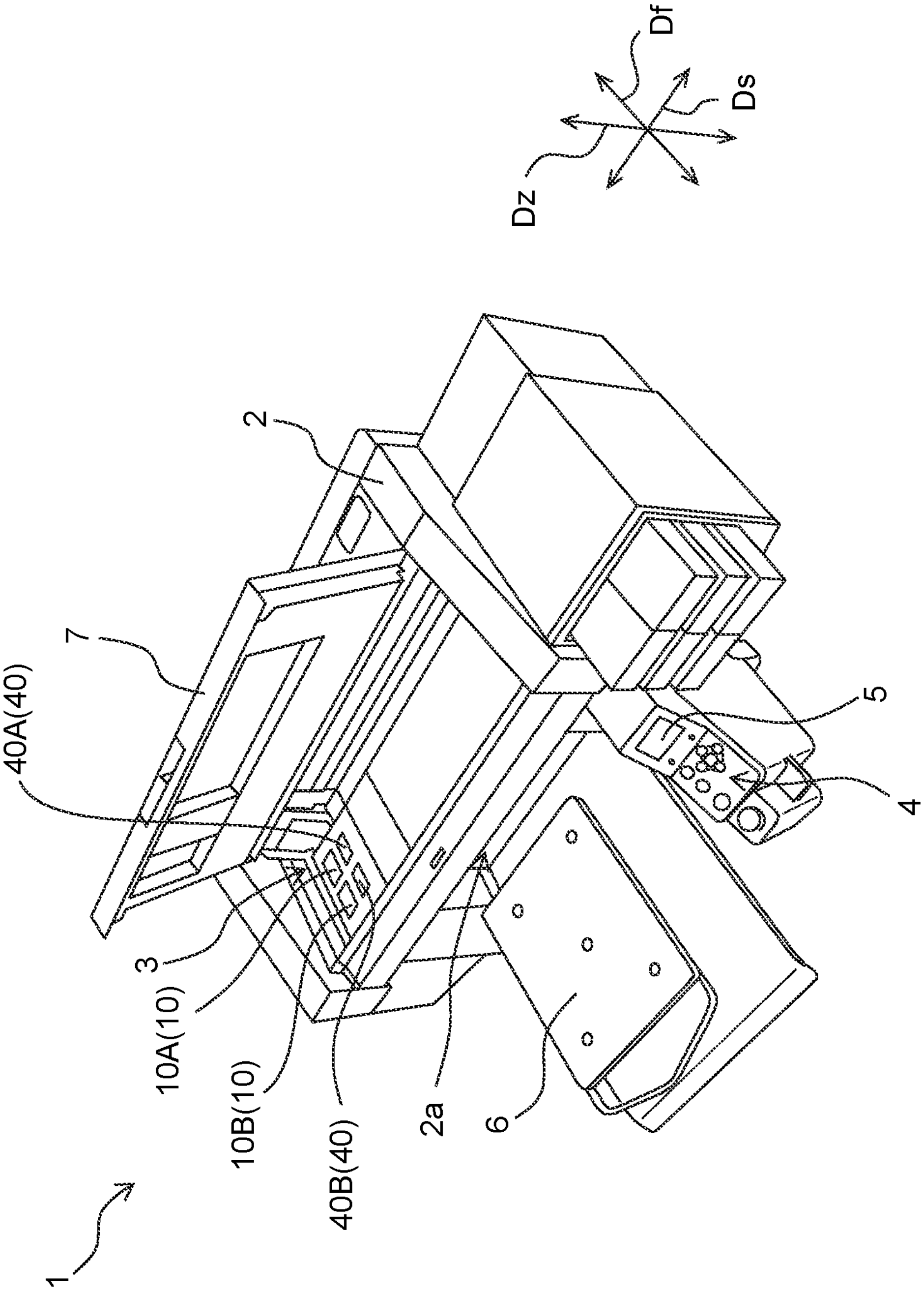
FIG. 1 is a perspective view depicting a printing apparatus according to an embodiment of the present disclosure.

FIG. 1 is a perspective view depicting a printing apparatus 1 according to the embodiment of the present disclosure. In FIG. 1, directions which are orthogonal to one another are defined as a first direction Ds, a second direction Df and a third direction Dz. In the present embodiment, for example, the first direction Ds is a moving direction of a carriage 3 (to be described later on), the second direction Df is a conveying direction of a print medium W (FIG. 6; to be described later on) and the third direction Dz is an up-down direction. In the following explanation, the first direction Ds is referred to as the moving direction Ds, the second direction Df is referred to as the conveying direction Df and the third direction Dz is referred to as the up-down direction Dz.

Figure 5:
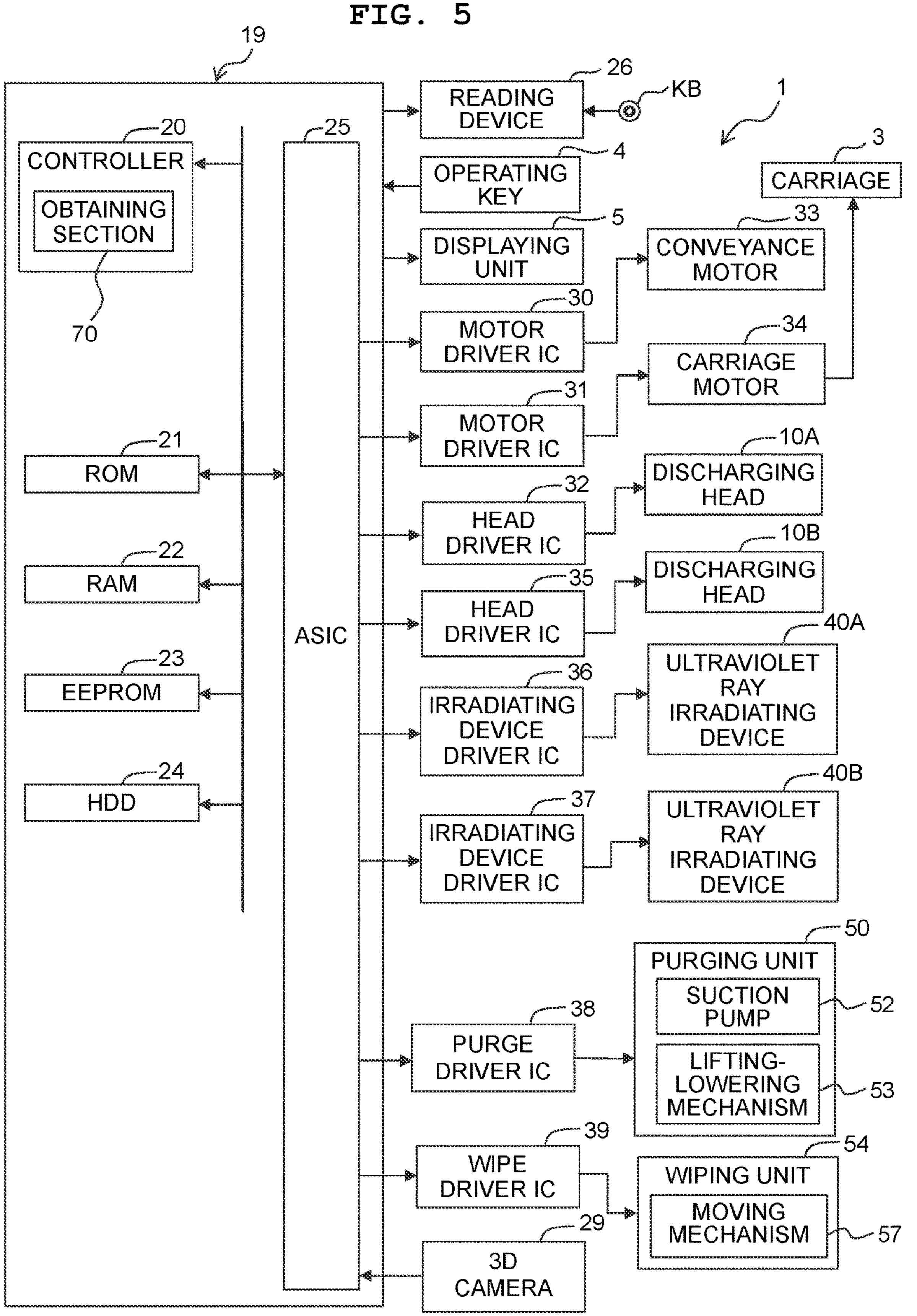
FIG. 5 is a block diagram depicting constituent elements of the printing apparatus of FIG. 1.

As depicted in FIG. 1, the printing apparatus 1 of the present embodiment is provided with: a liquid droplet discharging apparatus 1*a* (FIG. 2) including a casing 2, an operating key 4, a displaying unit 5, a platen 6 on which the print medium W is arranged, an upper cover 7, a discharging head 10 and a light source 40; and a controller unit 19 (FIG. 5) including a controller 20 (FIG. 5). The discharging head 10 is, for example, an ink-jet head which is configured to eject or discharge an ink droplet which is, for example, of an ultraviolet-curable type. The printing apparatus 1 is, for example, an ink-jet printer. Note that in the present embodiment, the controller 20 corresponds to a “controller”.

The casing 2 is formed to have a shape of a box. The casing 2 has an opening part 2*a*. The operating key 4 is provided on the casing 2. Further, the displaying unit 5 is provided in the vicinity of the operating key 4. The operating key 4 receives an operational input by a user. The displaying unit 5 is constructed, for example, of a touch panel, and displays specified information. A part of the displaying unit 5 functions also as the operating key. The controller unit 19 realizes a printing function based on an input from the operating key 4 or an external input via a non-illustrated communication interface. Further, the controller unit 19 controls display of the displaying unit 5.

The platen 6 is configured to be capable of placing the print medium W (to be described later on) thereon. The platen 6 has a predetermined thickness, and is constructed, for example, of a rectangular plate member of which longitudinal direction is the conveying direction Df. The platen 6 is detachably supported by a non-illustrated platen supporting stand. The platen supporting stand is configured to be movable in the conveying direction Df, by driving of a conveying motor 33 (FIG. 5), between a print position at which the printing with respect to the print medium W is executed and an attaching-detaching position at which the print medium W is detached from the platen 6. With this, the platen 6 relatively moves a print surface of the print medium W relative to the discharging head 10 in the conveying direction Df Since the platen 6 moves in the conveying direction Df during the printing, the print medium W placed on the platen 6 is conveyed along the conveying direction 6.

The upper cover 7 is configured such that in a case that an end part of the upper cover 7 is lifted upward, the upper cover 7 is rotated upward. With this, the inside of the casing 2 is exposed.

Figure 2:
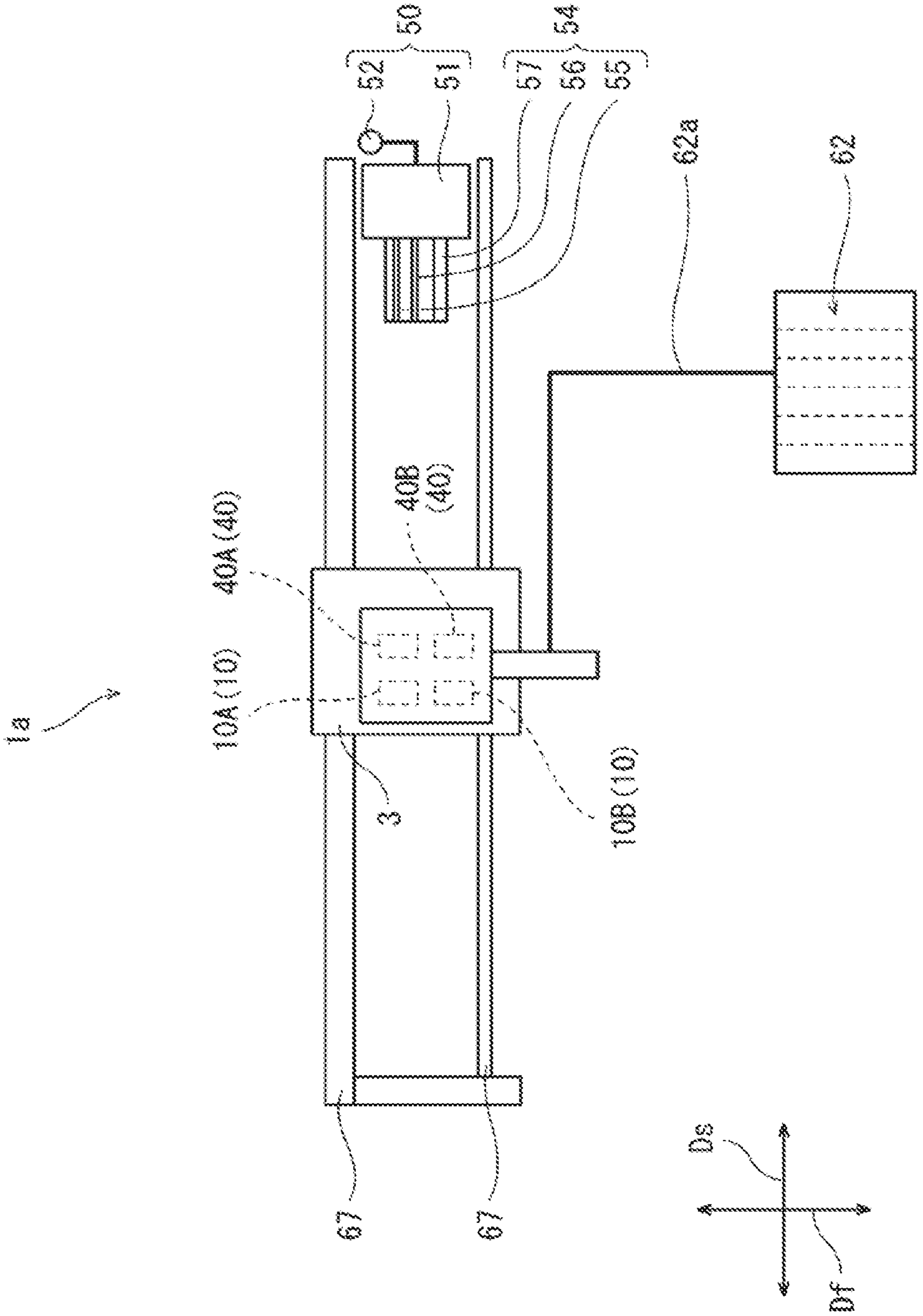
FIG. 2 is a plan view depicting a liquid droplet discharging apparatus in the printing apparatus of FIG. 1.

As depicted in FIG. 2, the liquid droplet discharging apparatus 1*a* is provided with: a storing tank 62, the carriage 3 on which, for example, two pieces of the discharging head 10 (discharging heads 10A and 10B) and two pieces of the light source 40 (ultraviolet ray irradiating devices 40A and 40B) are mounted, and a pair of guide rails 67. Each of the two discharging heads 10 has a plurality of nozzle rows arranged in the moving direction. Note that although the two discharging heads 10 and the two light sources 40 are provided on the liquid droplet discharging apparatus 1*a*, the configuration of the liquid droplet discharging apparatus 1*a* is not limited to this; it is also allowable to provide one discharging head 10 and one light source 40 on the liquid droplet discharging apparatus 1*a*.

The carriage 3 is supported by the pair of guide rails 67 extending in the moving direction Ds, and moves reciprocally in the moving direction Ds along the pair of guide rails 67. With this, the two discharging heads 10 (10A, 10B) and the two light sources 40 (40A, 40B) are made to be reciprocally movable in the moving direction Ds. Further, the discharging heads 10 are connected to the storing tank 62 via a tube 62*a*.

In the present embodiment, the discharging head 10A ejects or discharges, for example, ink droplets of respective colors which are yellow (Y), magenta (M), cyan (C) and black (K) which are collectively referred to as a color ink, in some cases. The ink droplets of the above-described four colors are discharged on the print medium W to thereby print a color image on the print medium W.

On the other hand, the discharging head 10B discharges, for example, ink droplets of a primer ink, ink droplets of white ink (W) and ink droplets of a clear ink (Cr). In a case of forming a base layer, the primer ink or the white ink is used as a base layer ink (ink for a base layer). Such a base layer ink is used for enhancing the fixing property of the color ink, and/or used for maintaining the shape of the print medium W. In particular, since the primer ink has a viscosity, it is possible to further enhance the fixing property of the color ink. The ink droplets of the base layer ink are previously discharged on the print medium W, and the ink droplets of the color ink are discharged on the ink droplets of the base layer ink. Further, the clear ink is used as a protective layer ink (ink for a protective layer); the ink droplets of the clear ink are discharged in a case of forming a protective layer for protecting a print part on which the printing is performed.

The inks are stored in the storing tank 62. The storing tank 62 is provided for each of kinds of the ink. The storing tank 62 is provided, for example, as six storing tanks 62, and store, respectively, the black, yellow, cyan, magenta, white and clear inks.

The liquid discharging apparatus 1*a* is further provided with a purging unit 50 and a wiping unit 54. The purging unit 50 and the wiping unit 54 are arranged on a side of an end part in the moving direction Ds of the pair of guide rails 67 so that the purging unit 50 and the wiping unit 54 overlap with a moving area of the carriage 3.

Figure 3:
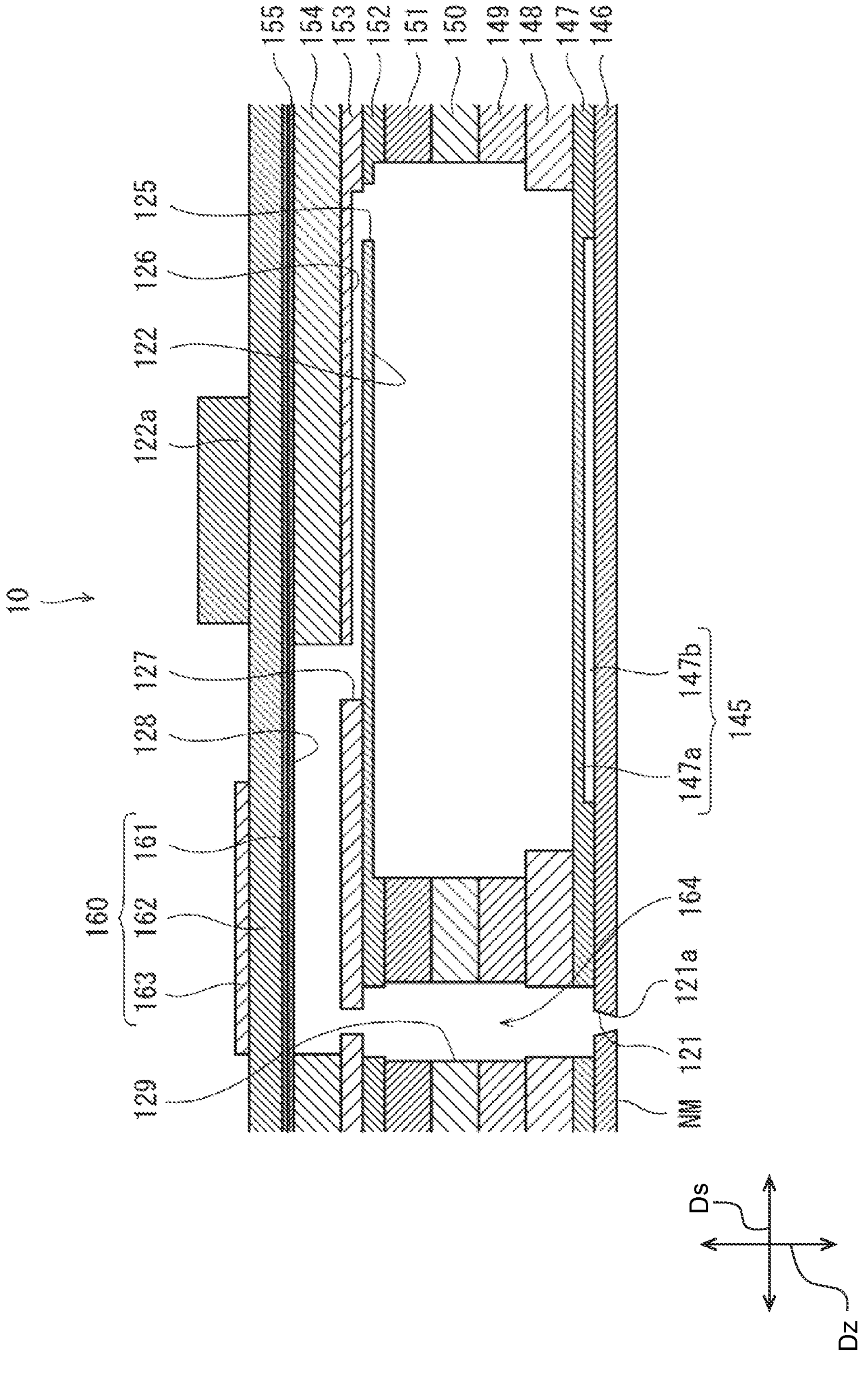
FIG. 3 is a cross-sectional view depicting the configuration of a discharging head of FIG. 1.

The purging unit 50 has a cap 51, a suction pump 52 and a lifting-lowering mechanism 53. The suction pump 52 is connected to the cap 51. The lifting-lowering mechanism 53 lifts and lowers the cap 51 between a suction position and a standby position. At the standby position, a discharge surface NM (FIG. 3) is away from the cap 51. On the other hand, at the suction position, the discharge surface NM is covered by the cap 51 and an enclosed space is defined. In a case that the cap 51 is at the suction position and that the suction pump 52 is driven, the suction is performed in the enclosed space, thereby performing a purging processing of discharging (exhausting) the ink from a nozzle holes 121*a* (FIG. 3; to be described later on).

Further, the wiping unit 54 has two wipers 55 and 56 and a moving mechanism 57. The two wipers 55 and 56 are supported by the moving mechanism 57. In a state that the discharge surface NM is arranged at a position facing (opposite to) the two wipers 55 and 56, the moving mechanism 57 moves in the conveying direction. With this, the two wipers 55 and 56 perform a wiping operation (namely, wiping of the discharge surface NM) while moving in the conveying direction Df.

Next, the detailed configuration of the discharging head 10 will be explained. As depicted in FIG. 3, the discharging head 10 has a plurality of nozzles 121 from which the ink droplets are discharged by using the ink(s) from the storing tank(s) 62. The discharging head 10 has a stacked body of a channel forming body and a volume changing part. An ink channel is formed in the inside of the channel forming body. A plurality of nozzle holes 121*a* is opened in the discharge surface NM which is a lower surface of the channel forming body. Further, the volume changing part is driven so as to change the volume of the ink channel. In this situation, in each of the plurality of nozzles holes 121*a*, the meniscus is vibrated so as to discharge the ink from each of the plurality of nozzles holes 121*a*.

The channel forming body of the discharging head 10 is a stacked body of a plurality of plates. The volume changing part includes a vibration plate 155 and an actuator (piezoelectric element) 160. A common electrode 161 (to be described later on) is connected to (formed on) the vibration plate 155.

The plurality of plates includes and is stacked, from the lower side in the following order: a nozzle plate 146, a spacer plate 147, a first channel plate 148, a second channel plate 149, a third channel plate 150, a fourth channel plate 151, a fifth channel plate 152, a sixth channel plate 153 and a seventh channel plate 154.

Holes and grooves of which size are various are formed in the respective plates. In the inside of the channel forming body in which the respective plates are stacked, the holes and grooves are combined to thereby form the plurality of nozzles 121, a plurality of individual channels 164 and a manifold 122, as the ink channel.

Each of the plurality of nozzles 121 is formed to penetrate through the nozzle plate 146 in a stacking direction. The plurality of nozzles holes 121*a* each of which is a forward end of one of the plurality of nozzles 121 is arranged side by side in the discharge surface NM of the nozzle plate 146 in the conveying direction Df so as to form the nozzle row.

The manifold 122 supplies the ink to a pressure chamber 128 to which a discharging pressure is applied. The manifold 22 extends in the conveying direction Df, and is connected to an end of each of the plurality of individual channels 164. Namely, the manifold 122 functions as a common channel of the ink. A through hole which penetrates through the first channel plates 148 to the fourth channel plate 151 in the stacking direction and a recessed part which is recessed from a lower surface of the fifth channel plate 152 are overlapped or stacked in the stacking direction to thereby form the manifold 122.

The nozzle plate 146 is arranged at a location below the spacer plate 147. The spacer plate 47 is formed, for example, of a stainless steel material. In the spacer plate 147, a recessed part 145 recessed from a surface, of the spacer plate 147 on a side of the nozzle plate 146, in a thickness direction of the spacer plate 147 is formed by, for example, the half etching. The recessed part 145 has a thinned part constructing a damper part 147*a* and a damper space 147*b*. With this, the damper space 147*b* as a buffer space is defined between the manifold 122 and the nozzle plate 146.

A supply port 122*a* is communicated with the manifold 122. The supply port 122*a* is formed, for example, in a cylindrical shape, and is provided on an end in the conveying direction Df of the manifold 122. Note that the manifold 122 and the supply port 122*a* are connected to each other by a non-illustrated channel.

Each of the plurality of individual channels 164 is connected to the manifold 122. Each of the individual channels 164 has an upstream end connected to the manifold 122 and a downstream end connected to a base end of one of the plurality of nozzles 121. Each of the individual channels 164 is constructed of a first communicating hole 125, a supply throttle channel 126 as an individual throttle channel, a second communicating hole 127, the pressure chamber 128, and a descender 129; and these constitutive elements are arranged in this order.

A lower end of the first communicating hole 125 is connected to an upper end of the manifold 122. The first communicating hole 125 extends from the manifold 122 upward in the stacking direction, and penetrates an upper part in the fifth channel plate 152 in the stacking direction.

An upstream end of the supply throttle channel 126 is connected to an upper end of the first communicating hole 125. The supply throttle channel 126 is formed, for example, by the half etching, and is constructed of a groove recessed from a lower surface of the sixth channel plate 153. Further, an upstream end of the second communicating hole 127 is connected to a downstream end of the supply throttle 126. The second communicating hole 127 extends from the supply throttle channel 126 upward in the stacking direction, and is formed to penetrate the sixth channel plate 153 in the stacking direction.

An upstream end of the pressure chamber 128 is connected to a downstream end of the second communicating channel 127. The pressure chamber 128 is formed to penetrate the seventh channel plate 154 in the stacking direction.

The descender 129 is formed to penetrate, in the stacking direction, the spacer plate 147, the first channel plate 148, the second channel plate 149, the third channel plate 150, the fourth channel plate 151, the fifth channel plate 152 and the sixth channel plate 153. An upstream end of the descender 129 is connected to a downstream end of the pressure chamber 128 and a downstream end of the descender 129 is connected to the base end of each of the nozzles 121. For example, each of the nozzles 121 overlaps with the descender 129 in the stacking direction, and is arranged at the center in the descender 129 in a width direction.

The vibration plate 155 is stacked on the seventh channel plate 154 and covers an upper end opening of the pressure chamber 128.

The actuator 160 includes the common electrode 161, a piezoelectric layer 162 and an individual electrode 163 which are arranged from the lower side in this order. The common electrode 161 covers the entire surface of the vibration plate 155. The piezoelectric layer 162 covers the entire surface of the common electrode 161. The individual channel 163 is provided on the pressure chamber 128, and is arranged on the piezoelectric layer 162. One piece of the actuator 160 is constructed of one piece of the individual electrode 163, the common electrode 131 and a part (active part), of the piezoelectric layer 162, which are sandwiched by one piece of the individual electrode 163 and the common electrode 161.

The individual electrode 163 is electrically connected to a driver IC. The driver IC receives a control signal from the controller 20, generates a driving signal (voltage signal) and applies the driving signal to the individual electrode 163. In contrast, the common electrode 161 is always maintained at a ground potential. In such a configuration, the active part of the piezoelectric layer 162 expands and contracts in accordance with the driving signal, together with the common electrode 161 and the individual electrode 163, in a plane direction. In response to and cooperating with this, the vibration plate 155 deforms in a direction increasing or decreasing the volume of the pressure chamber 128. With this, the discharging pressure of discharging the ink droplet from each of the nozzles 121 is imparted to the ink inside the pressure chamber 128.

In the discharging head 10, the ink flows into the manifold 122 via the supply port 122*a*, and then flows into the supply throttle channel 126 from the manifold 122 via the first communicating hole 125. Further, the ink flows into the pressure chamber 128 from the supply throttle channel 126 via the second communicating hole 127. Afterwards, the ink flows in the descender 129 and flows into each of the nozzles 121. In this situation, in a case that the discharging pressure is applied from the actuator 160 to the pressure chamber 128, the ink droplet is discharged from one of the nozzle holes 121*a*.

Figure 4:
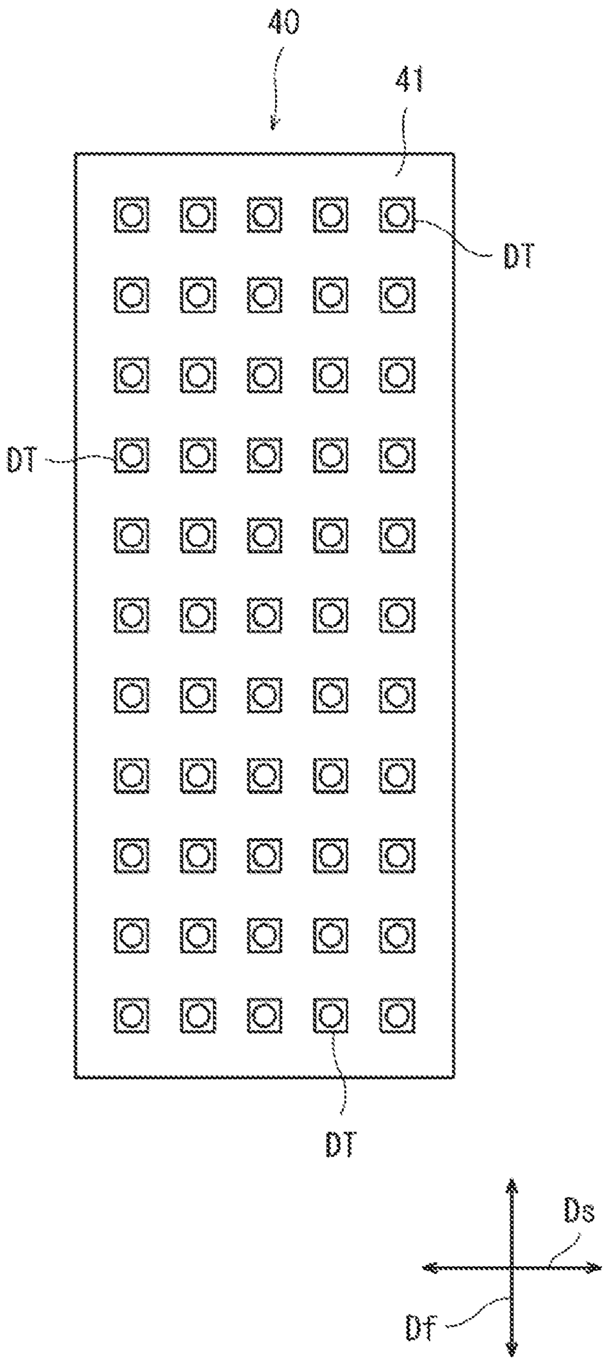
FIG. 4 is a view depicting a light-emitting diode chip in a light source of FIG. 1.

FIG. 4 is a view depicting a light emitting diode chip DT in the light source 40. As depicted in FIG. 4, the light source 40 has a supporting substrate 41 and a plurality of pieces of the light emitting diode chip DT arranged in the supporting substrate 41 and configured to emit an ultraviolet ray. Each of the plurality of light emitting diode chips DT emits the ultraviolet ray for curing the ink discharged by the discharging head 10. Each of the plurality of light emitting diode chips DT is a semiconductor element configured to generate the ultraviolet ray. The plurality of light emitting diode chips DT is arranged, for example, at a regular spacing distance in the moving direction Ds and at a regular spacing distance in the conveying direction Df. The plurality of light emitting diode chips DT are arranged, for example, in a matrix shape.

Next, the respective constituent elements of the printing apparatus 1 of the present embodiment will be explained with reference to a block diagram of FIG. 5.

As depicted in FIG. 5, the printing apparatus 1 is further provided with the controller unit 19, a reading device 26, motor driver ICs 30, 31, head driver ICs 32, 35, the conveying motor 33, a carriage motor 34, irradiating device driver ICs 36, 37, a purge driver IC 38, a wipe driver IC 39 and a 3D camera 29, in addition to the above-described constituent elements.

The controller unit 19 has the controller 20 constructed of a CPU, memories (storing parts: a ROM 21, a RAM 22, an EEPROM 23 (EEPROM is a registered trademark of Renesas Electronics Corporation) and a HDD 24) and an ASIC 25. The controller 20 is connected to each of the above-described memories, and controls the driver ICs 30 to 32 and 35 to 39 and the displaying unit 5.

The controller 20 executes a predetermined processing program stored in the ROM 21 to thereby executes a variety of kinds of functions. The controller 20 may be mounted on the controller unit 19 as one processor, or may be mounted on the controller unit 19 as a plurality of processors which cooperate each other. The processing program is read by the reading device 26 from a recording medium KB such as a computer-readable magneto-optical disc, etc., or a USB flash memory, etc., and the like, and is stored in the ROM 21. The RAM 22 stores image data received from outside and an arithmetic result of the controller 20, etc. The EEPROM 23 stores a variety of kinds of initial setting information inputted by the user. The HDD 24 stores specific information, etc.

The motor driver ICs 30 and 31, the head driver ICs 32, 35, the irradiating device driver ICs 36, 37, the purge driver IC 38, the wipe driver IC 39 and the 3D camera 29 are connected to the ASIC 25. In a case that the controller 20 receives a print job from the user, the controller 20 outputs a processing instruction to the ASIC 25, based on the processing program. The ASIC 25 drivers the respective driver ICs 30 to 32 and 35 to 39, based on the processing instruction. The controller 20 drives the conveying motor 33 by the motor driver IC 30 to thereby move the platen 6 in the conveying direction Df. The controller 20 drives the carriage motor 34 by the motor driver IC 31 to thereby move the carriage 3 in the moving direction Ds.

The controller 20 converts the image data obtained from an external apparatus, etc., into discharge data for discharging the ink droplets onto the print surface of the print medium W. The controller 20 causes the discharging head 10 to discharge the ink droplets from the discharging head 10 by the head driver ICs 32, 35 based on the converted discharge data. Further, the controller 20 causes the respective light-emitting diode chips of each of the ultraviolet ray irradiating devices 40A and 40B to radiate an ultraviolet ray by the irradiating device driver ICs 36, 37. The controller 20 drives the suction pump 52 and the lifting-lowering mechanism 53 of the purging unit 50 by the purge driver IC 38. The controller 20 drives the moving mechanism 57 of the wiping unit 54 by the wipe driver IC 39.

The controller 20 has, as a functional configuration thereof, the obtaining section 70. The 3D camera 29 is provided, for example, on the carriage 3 and images the print medium W. The obtaining section 70 of the controller 20 receives information regarding a shape of the print medium W imaged by the 3D camera 29. Note that it is allowable to use another device or apparatus, for example, such as a distance measuring sensor, which is different from the 3D camera 29 configured to image the print medium W, so as to obtain the shape of the print medium W, rather than using the 3D camera 29.

Figure 6:
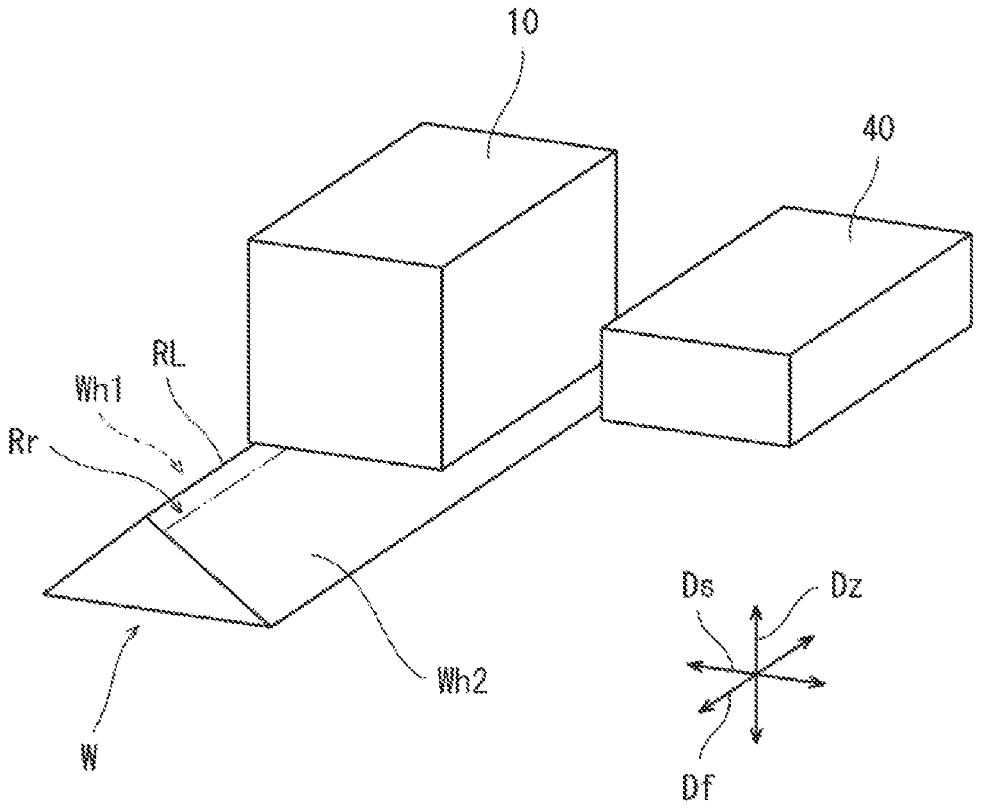
FIG. 6 is a perspective view depicting a print medium as an object of printing (print object) of the printing apparatus of FIG. 1.
Figure 7:
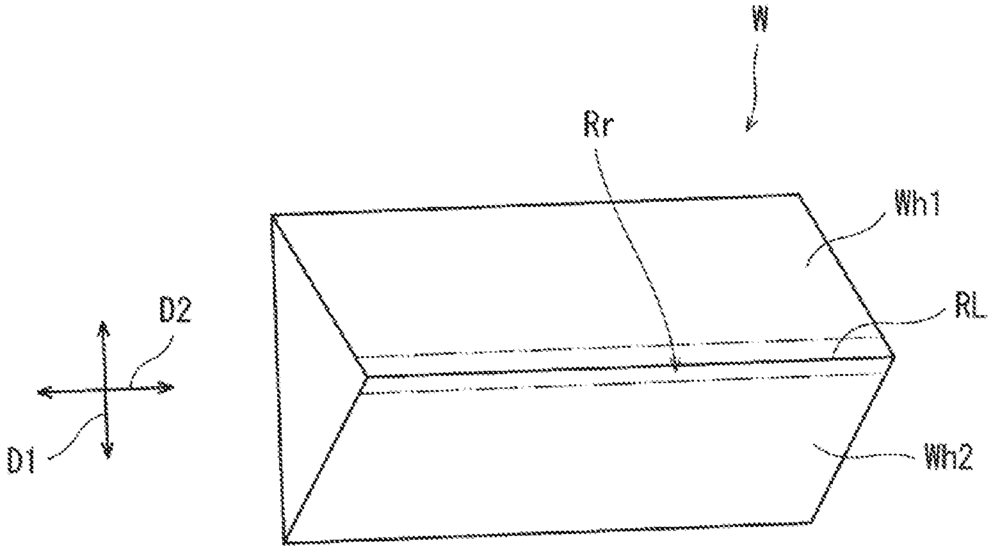
FIG. 7 is a perspective view depicting the print medium as seen from a direction different form that in FIG. 6.

FIG. 6 is a perspective view depicting the print medium W as an object of printing (print object) of the printing apparatus 1, and FIG. 7 is a perspective view depicting the print medium W as seen from a direction different form that in FIG. 6. The discharging head 10 performs the printing with respect to the print medium W which is a three-dimensional object having a ridge line. Note that FIGS. 6 and 7 depicts a print medium W formed to have a triangular pyramid shape, as an example of the shape.

As depicted in FIGS. 6 and 7, the print medium W has one print surface Wh1 and the other print surface Wh2 which are adjacent to each other in the print medium W. A boundary between the print surface Wh1 and the print surface Wh2 becomes to be a ridge line RL.

The controller 20 executes a processing of controlling a discharging operation of the discharging head 10 so as to increase an amount per unit area of the ink with respect to a ridge line present area Rr which is an area including the ridge line RL than an amount per the unit area of the ink with respect to another area different from the ridge line present area Rr (hereinafter referred also to as an “ink amount increasing processing” in some cases). In the present embodiment, the controller 20 is capable of executing the ink amount increasing processing with respect to the discharging head 10A. An ink droplet, of a color ink, of which amount per unit area is increased than that in the area different from the ridge line present area Rr is discharged with respect to the ridge line present area Rr by the discharging head 10A. With this, a thickness of the print part in the ridge line present area Rr can be made greater than a thickness of the print part in the area different from the ridge line present area Rr. Note that in FIG. 8, the illustration of a print part of the color ink is omitted.

Figure 8:
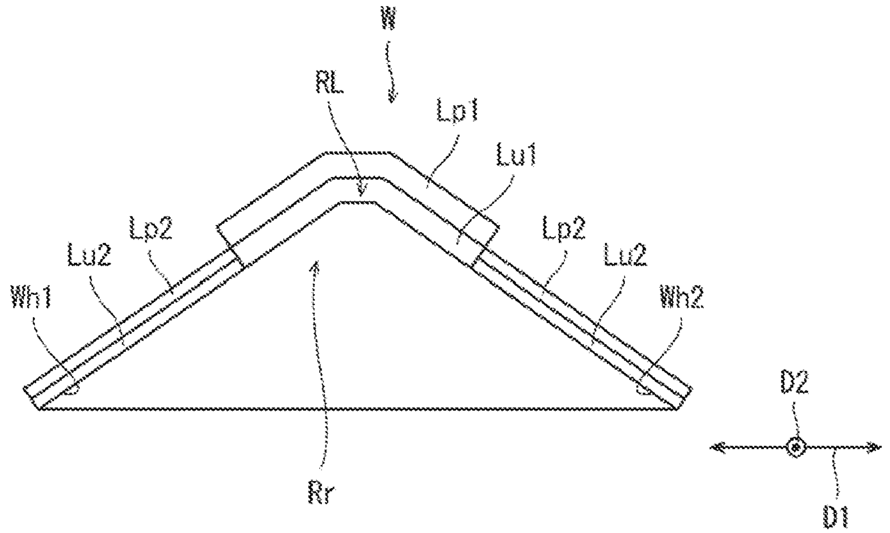
FIG. 8 is a view depicting a base layer and a protective layer in a ridge line present area and the base layer and the protective layer in an area different from the ridge line present area.

Further, the controller 20 is capable of executing the ink amount increasing processing with respect also to the discharging head 10B. An ink droplet of the primer ink or of the white ink, of which amount per unit area is increased than that with respect to the area different from the ridge line present area Rr is discharged, by the discharging head 10B, with respect to the ridge line present area Rr. With this, as depicted in FIG. 8, a thickness of a base layer Lu1 in the ridge line present area Rr can be made greater than a thickness of a base layer Lu2 in the area different from the ridge line present area Rr. Further, an ink droplet of the clear ink of which amount per unit area is increased than that with respect to the area different from the ridge line present area Rr is discharged, by the discharging head 10B, with respect to the ridge line present area Rr. With this, as depicted in FIG. 8, a thickness of a protective layer Lp1 in the ridge line present area Rr can be made greater than a thickness of a protective layer Lp2 in the area different from the ridge line present area Rr.

It is allowable that at least one of the ink amount increasing processing with respect to the print part by the color ink in the ridge line present area Rr, the ink amount increasing processing with respect to the base layer Lu1 in the ridge line present area Rr and the ink amount increasing processing with respect to the protective layer Lp1 in the ridge line present area Rr is executed.

Although the print medium W depicted in FIGS. 6 and 7 has a plurality of ridge lines, the ridge line included in the ridge line present area Rr in which the printing is performed by the discharging head 10 is only the ridge line RL defined by the print surface Wh1 and the print surface Wh2 which face or are opposite to the discharge surface NM of the discharging head 10 in a case that the discharging head 10 reciprocally moves in the moving direction Ds. Accordingly, in the print medium W having the triangular pyramid shape, for example, a ridge line between the print surface Wh1 and another print surface (a print surface different from the print surfaces Wh1 and Wh2) and, for example, a ridge line between the print surface Wh2 and an end surface in the axial line direction of the print medium W, etc., do not correspond to the ridge line RL included in the ridge line present area Rr.

A processing procedure of the controller 20 is as follows. After the controller 20 receives the print data from the outside (the external apparatus, etc.), the controller 20 obtains, from the 3D camera 29, the information regarding the shape of the print object W on the platen 6. The controller 20 determines as to whether or not a correction is necessary or required (namely, determines as to whether or not the ink amount increasing processing is required), based on the print data and the shape of the print medium W. In this situation, it is determined that the correction is required, in a case that the ridge line RL defined as described in the foregoing is present in the print medium W. Further, the controller 20 determines a method of (performing) the ink amount increasing processing and an increasing amount (a size and a thickness of layer of the ridge line present area Rr) which are to be described later on so as to prepare print image data. The controller 20 causes the discharging head 10 to execute the printing, based on the prepared print image data.

Figure 9:
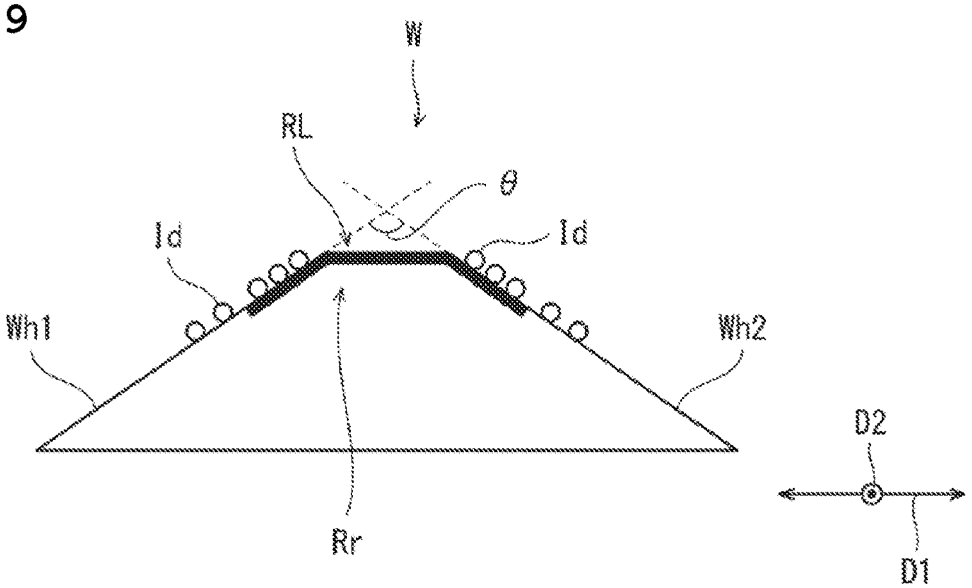
FIG. 9 is a view for explaining a number of discharge of an ink droplet in the ridge line present area and a number of discharge of the ink droplet in the area different from the ridge line present area.
Figure 10:
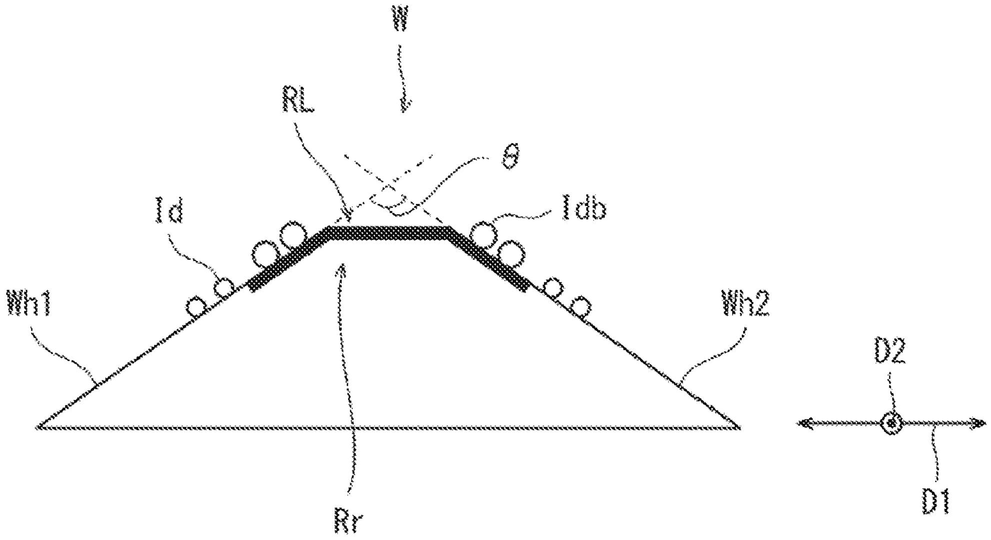
FIG. 10 is a view for explaining a size of the ink droplet in the ridge line present area and a size of the ink droplet in the area different from the ridge line present area.

A specific method of the ink amount increasing processing will be explained. FIG. 9 is a view for explaining a number of discharge of an ink droplet Id in the ridge line present area Rr and a number of discharge of the ink droplet Id in the area different from the ridge line present area Rr. Further, FIG. 10 is a view for explaining a size of the ink droplet Id in the ridge line present area Rr and a size of the ink droplet Id in the area different from the ridge line present area. Note that a line indicating the ridge line present area Rr is illustrated to be made bold so that the method is easily understood.

In the present embodiment, the ridge line RL includes a straight line which does not have a width in a direction D1 and which extends in a direction D2 orthogonal to the direction D1, and also includes a ridge line which has a predetermined width in the direction D1 and which extends in the direction D2, as depicted in FIGS. 9 and 10. Note that in FIGS. 9 and 10, an angle defined by the one print surface Wh1 and the other print surface Wh2 is defined as an angle $\theta$.

As depicted in FIG. 9, the controller 20 controls, in the ink amount increasing processing, the discharging operation of the discharging head 10 so that the number of discharge with respect to the ridge line present area Rr is increased than that with respect to the area different from the ridge line present area Rr. With this, it is possible to increase the amount per unit area of the ink with respect to the ridge line present area Rr than that in the area different from the ridge line present area Rr. Note that each of the ink droplets Id in FIG. 9 and in FIG. 10 (which will be described below) is either one of an ink droplet of the color ink, an ink droplet of the primer ink or of the white ink forming the base layer and an ink droplet of the clear ink forming the protective layer.

Alternatively, it is allowable to perform the control as follows. As depicted in FIG. 10, the controller 20 may control, in the ink amount increasing processing, the discharging operation of the discharging head 10 so that the size of an ink droplet Idb to be discharged with respect to the ridge line present area Rr becomes greater than a size of an ink droplet Id to be discharged with respect to the area different from the ridge line present area Rr. Also with this, it is possible to increase the amount per unit area of the ink with respect to the ridge line present area Rr than that in the area different from the ridge line present area Rr.

Still alternatively, the controller 20 may control, in the ink amount increasing processing, the discharging head 10 so as to perform the discharging operation by a pass, with respect to the ridge line present area Rr, of which number is greater than a pass by which the discharging operation is to be performed with respect to the area different from the ridge line present area Rr. In this case, for example, the discharging head 10 performs the discharging operation with respect to the area different from the ridge line present area Rr by one pass, and performs the discharging operation with respect to the ridge line present area Rr by two passes. Also with this, it is possible to increase the amount per unit area of the ink with respect to the ridge line present area Rr than that in the area different from the ridge line present area Rr.

Here, the size (area) of the ridge line present area Rr as described above can be changed. The controller 20 changes the area of the ridge line present area Rr based on a material of the print medium W. In a case that the material of the print medium W is relatively hard (in a case that a deformation amount of the print medium W is relatively small), the controller 20 makes the area of the ridge line present area Rr to be relatively small, whereas in a case that the material of the print medium W is relatively soft (in a case that a deformation amount of the print medium W is relatively great), the controller 20 makes the area of the ridge line present area Rr to be relatively great. Further, in a case that a fixing property of the ink droplets in the printing medium W is not satisfactory, the controller 20 makes the area of the ridge line present area Rr to be relatively great.

As a specific example of a method of changing the area of the ridge line present area Rr, it is allowable, for example, to previously store, in the memory or memories such as the ROM 21 or the HDD 24, etc., a table indicating a corresponding relationship between a material of the print medium W and a coefficient corresponding to the material (respective coefficients, with a coefficient in a case that the print medium W is formed of a predetermined reference material being 1.0). The controller 20 is capable of reading the coefficient from the memory or memories, based on the material of the print medium W, and of obtaining an area, of the ridge line present area Rr, which corresponds to the material by multiplying, by the coefficient, an area (reference area) of the ridge line present area Rr in a case that the material of the print medium W is the reference material. The controller 20 causes the discharging head 10 to discharge the ink droplets with respect to the ridge line present area Rr having the obtained area. With this, it is possible to perform the ink amount increasing operation with respect to the ridge line present area Rr having the area corresponding to the material of the print medium W.

Further, the controller 20 may change the thickness of the base layer Lu1 and the thickness of the protective layer Lp1 in the ridge line present area Rr, based on the material of the print medium W. In view of this point, in a case that the material of the print medium W is relatively hard, the controller 20 makes thickness of the base layer Lu1 and the thickness of the protective layer Lp1 in the ridge line present area Rr to be relatively thick or great from the viewpoint of preventing any generation of a chip (break); whereas in a case that the material of the print medium W is relatively soft, the controller 20 makes thickness of the base layer Lu1 and the thickness of the protective layer Lp1 in the ridge line present area Rr to be relatively thin or small. Further, in a case that the fixing property of the ink droplets in the print medium W is not satisfactory, the controller 20 makes thickness of the base layer Lu1 and the thickness of the protective layer Lp1 in the ridge line present area Rr to be relatively thick or great.

The controller 20 may change the area of the ridge line present area Rr based on the angle θ defined by the one print surface Wh1 and the other print surface Wh2. In this case, it is allowable, for example, to previously store, in the memory or memories such as the ROM 21 or the HDD 24, etc., a table indicating a corresponding relationship between an angle θ and a coefficient corresponding to the angle θ (the coefficient, with a coefficient in a case that the angle θ is a predetermined reference angle being 1.0). The controller 20 is capable of reading the coefficient from the memory or memories, based on the angle θ, and of obtaining an area, of the ridge line present area Rr, which corresponds to the angle θ by multiplying, by the coefficient, an area (reference area) of the ridge line present area Rr in a case that the angle θ is the reference angle. The controller 20 causes the discharging head 10 to discharge the ink droplets with respect to the ridge line present area Rr having the obtained area. With this, it is possible to perform the ink amount increasing operation with respect to the ridge line present area Rr having the area corresponding to the angle θ. In this case, as the angle θ is smaller, the area of the ridge line present area RR is made to be greater.

The controller 20 may change the thickness of the base layer Lu1 and the thickness of the protective layer Lp1 in the ridge line present area Rr based on the angle θ. In this case, as the angle θ is smaller, the thickness of the base layer Lu1 and the thickness of the protective layer Lp1 are made to be greater.

Figure 11A:
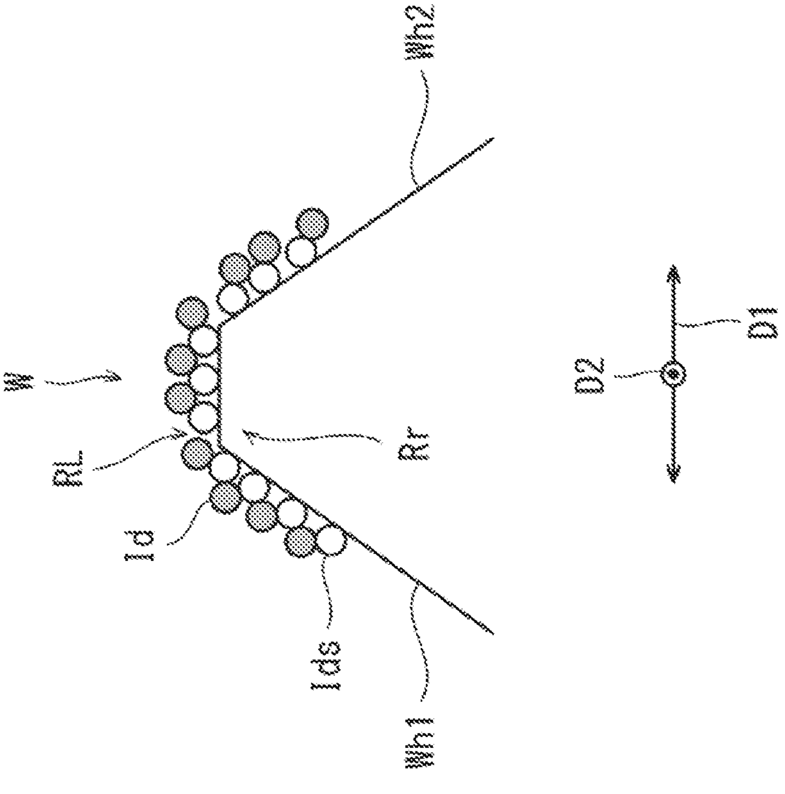
FIG. 11A is a view depicting a cured state of ink droplets constructing the base layer and ink droplets of a color ink in a conventional technique.
Figure 11B:
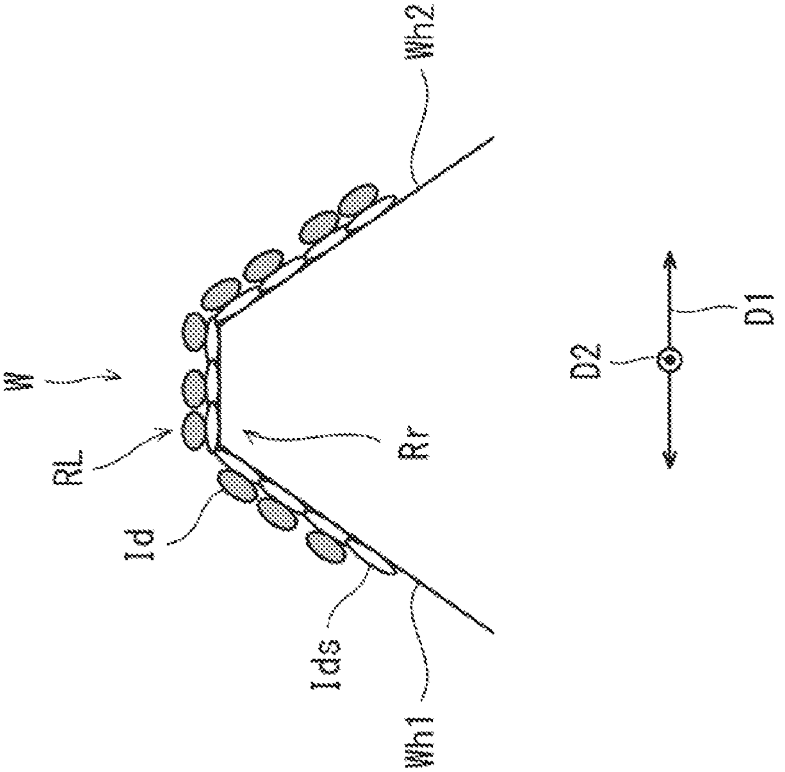
FIG. 11B is a view depicting a cured state of the ink droplets constructing the base layer and the ink droplets of the color ink in an embodiment of the present disclosure.

FIG. 11A is a view depicting a cured state of ink droplets constructing the base layer and ink droplets of the color ink in a conventional technique, and FIG. 11B is a view depicting a cured state of the ink droplets constructing the base layer and the ink droplets of the color ink in the present embodiment.

As depicted in FIG. 11A, in a case that the ultraviolet ray is irradiated at a relatively early stage since ink droplets Ids forming the base layer have been discharged, the ink droplets Ids are cured in a state that the ink droplets Ids do not have a flat shape. Due to this, a contact area between the ink droplets Ids and the ink droplets Id of the color ink discharged thereafter becomes to be small. As a result, the fixing property of the ink droplets Id of the color ink with respect to the ink droplets Ids becomes low. Further, since the coverage of the print surfaces Wh1 and Wh2 by the base layer also becomes small, which in turn makes the base layer to be easily seen or visible.

In contrast, in the present embodiment, the ultraviolet ray is irradiated at a relatively late stage since ink droplets Ids forming the base layer have been discharged. Owing to this, it is possible to make the ink droplets Ids to be cured (or half cured) in a state that the ink droplets Ids have a flat shape. With this, the contact area between the ink droplets Ids and the ink droplets Id of the color ink discharged thereafter becomes to be great. Owing to this, the fixing property of the ink droplets Id of the color ink with respect to the ink droplets Ids becomes high. Further, since the coverage of the print surfaces Wh1 and Wh2 by the base layer also becomes great, which in turn makes the base layer to be hardly or less likely to be seen or visible.

As explained above, according to the printing apparatus 1, in the ink amount increasing processing, the amount per unit area of the ink with respect to the ridge line present area Rr is increased than that with respect to the area different from the ridge line present area Rr. With this, it is possible to suppress or prevent any appearance of a blank part (void, a white patch on a printed sheet) in a printed image in the ridge line present area Rr due to any positional deviation in the landing position of the ink droplets. With this, it is possible to improve the quality of the result of printing and to further suppress any occurrence of a peeling of the ink by a contact made by the ridge line present area Rr of the print medium W with the outside.

Further, in the present embodiment, in the ink amount increasing processing, the number of discharge with respect to the ridge line present area Rr is increased than that in the area with respect to the area different from the ridge line present area Rr. With this, it is possible to easily increase the amount per unit area of the ink with respect to the ridge line present area Rr.

Furthermore, in the present embodiment, in the ink amount increasing processing, the size of an ink droplet Idb to be discharged with respect to the ridge line present area Rr is greater than the size of the ink droplet Id to be discharged with respect to the area different from the ridge line present area Rr. With this, it is possible to easily increase the amount per unit area of the ink with respect to the ridge line present area Rr than that in the area different from the ridge line present area Rr.

Furthermore, in the present embodiment, in the ink amount increasing processing, the discharging operation with respect to the ridge line present area Rr is performed by the pass of which number is greater than the pass by which the discharging operation is to be performed with respect to the another area different from the ridge line present area Rr. With this, it is possible to easily increase the amount per unit area of the ink with respect to the ridge line present area Rr.

Moreover, in the present embodiment, in the ink amount increasing processing, the size of the ridge line present area Rr is changed and the thickness of the base layer Lu1 and the thickness of the protective layer Lp1 are changed, based on the material of the print medium W. Namely, from the viewpoint of suppressing or preventing any appearance of the blank part in the printed image, it is possible to appropriately change the thickness of the base layer Lu1 and the thickness of the protective layer Lp1, depending on the hardness (softness) of the print medium W.

Further, in the present embodiment, the area of the ridge line present area Rr is changed based on the angle θ defined by the one print surface Wh1 and the other print surface Wh2 and the thickness of the base layer Lu1 and the thickness of the protective layer Lp1 are changed. Namely, from the viewpoint of suppressing or preventing any appearance of the blank part in the printed image, it is possible to appropriately change the thickness of the base layer Lu1 and the thickness of the protective layer Lp1, depending on the angle θ (namely, the shape of the print medium W).

OTHER EMBODIMENTS

The present disclosure is not limited to or restricted by the above-described embodiment. It is possible to adopt another embodiment within a range not departing from the gist or spirit of the present disclosure. For example, it is allowable to adopt the following configuration.

Figure 12:
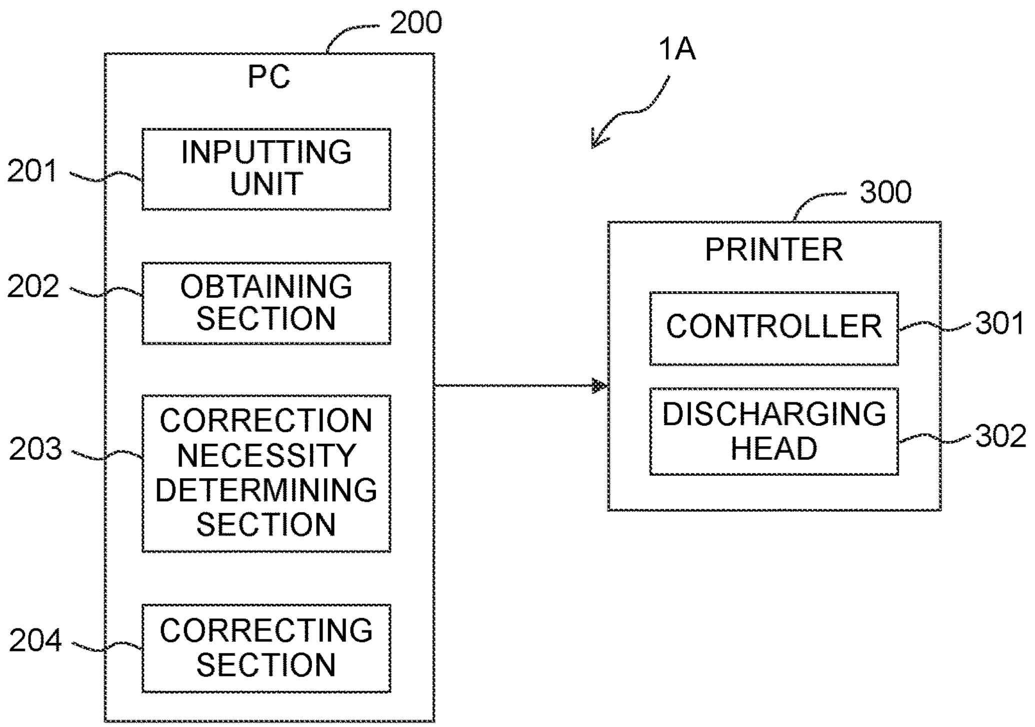
FIG. 12 is a block diagram depicting the configuration of a printing apparatus according to a modification of the printing apparatus of FIG. 1.

The present embodiment is provided with such a configuration that the controller 20 in the printing apparatus 1 is configured to determine as to whether or not the correction is required (namely, determines as to whether or not the ink amount increasing processing is required), based on the print data and the shape of the print medium W. Namely, it is configured that the determination as to whether or not the correction is required is performed on the side of the printer. The present disclosure, however, is not limited to this; it is allowable to configure the printing apparatus as follows. FIG. 12 is a block diagram depicting the configuration of a printing apparatus 1A according to a modification of the printing apparatus 1 of FIG. 1.

As depicted in FIG. 12, the printing apparatus 1A is a technical concept including, for example, a computer 200 such as a personal computer, etc., and a printer 300. The printer 300 has a same printing function as that of the printing apparatus 1 of FIG. 1. The computer 200 has an inputting unit 201 such as a keyboard, etc., an obtaining section 202, a correction necessity determining section 203 and a correcting section 204. The obtaining section 202, the correction necessity determining section 203 and the correcting section 204 are functional configurations of a CPU provided on the computer 200. Further, the printer 300 includes a controller 301 and a discharging head 302.

The user uses the inputting unit 201 of the computer 200 so as to input print data and information regarding the shape of the print medium W. The obtaining section 200 obtains the inputted information regarding the shape of the print medium W. The correction necessity determining section 203 determines as to whether or not the correction is necessary or required, based on the print data and the shape of the print medium W. The correcting section 204 determines the method of the ink amount increasing processing and the increase amount (the area and the thickness of the layer of the ridge line present area Rr), prepares print image data, and transmits, to the printer 300, the print image data. In this case, the correcting section 204 applies a layer adding processing of adding a color layer, a layer for a protective layer, etc., in the print image data. On the other hand, the controller 301 of the printer 300 causes the discharging head 302 to execute the printing, based on the print image data transmitted from the computer 200. As described above, it is allowable to prepare the print image data after correction on the side of the computer 200.

Figure 13:
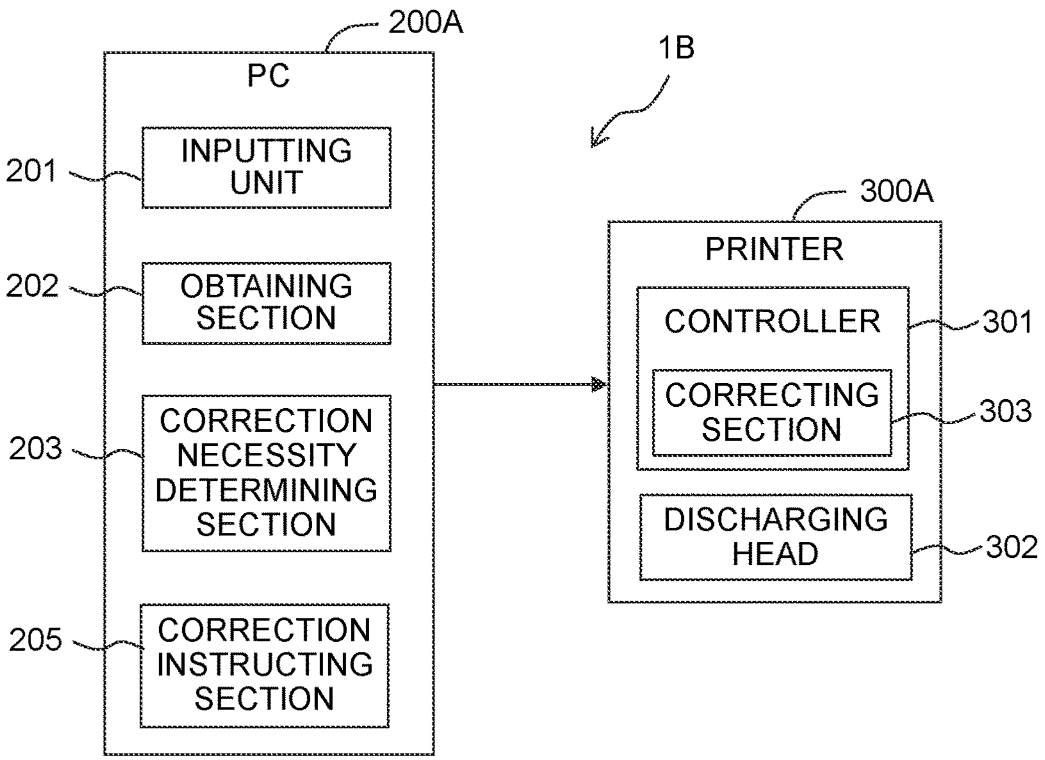
FIG. 13 is a block diagram depicting the configuration of a printing apparatus according to a modification of the printing apparatus of FIG. 12.

Further, it is allowable to modify the configuration of the printing apparatus 1A of FIG. 12 as follows. FIG. 13 is a block diagram depicting the configuration of a printing apparatus 1B according to a modification of the printing apparatus 1A of FIG. 12.

As depicted in FIG. 13, the printing apparatus 1B is a technical concept including, for example, a computer 200A such as a personal computer, etc., and a printer 300A. The printer 300A has a same printing function as that of the printing apparatus 1 of FIG. 1. The computer 200A has an inputting unit 201, an obtaining section 202, a correction necessity determining section 203 and a correction instructing section 205. The obtaining section 202, the correction necessity determining section 203 and the correction instructing section 205 are functional configurations of a CPU provided on the computer 200A. Further, the printer 300A includes a controller 301 having a correcting section 303, and a discharging head 302.

The user uses the inputting unit 201 of the computer 200A so as to input print data and information regarding the shape of the print medium W. The obtaining section 202 obtains the inputted information regarding the shape of the print medium W. The correction necessity determining section 203 determines as to whether or not the correction is necessary or required, based on the print data and the shape of the print medium W. The correction instructing section 205 determines the method of the ink amount increasing processing and the increase amount (the area and the thickness of the layer of the ridge line present area Rr), and transmits, to the printer 300A, data in which correction instruction information is added to print image data before correction. In this case, the correction instructing section 205 adds the method of the ink amount increasing processing, the increase amount (the area and the thickness of the layer of the ridge line present area Rr) and setting information of a discharge waveform to the print image data, as the correction instruction information. On the other hand, the correcting section 303 of the controller 301 of the printer 300A prepares print image data after correction based on the print image data which has been transmitted from the computer 200A and to which the correction instruction information has been added, and causes the discharging head 302 to execute the printing, based on the print image data after correction. As described above, it is allowable that only the correction instruction information is prepared on the side of the computer 200 and that the print image data after correction based on the correction instruction information is prepared on the side of the printer 300A.

What is claimed is:

1. A printing apparatus comprising:

a discharging head configured to discharge at least one ink among a printing ink of an ultraviolet curable type, a base layer ink for forming a base layer and a protective layer ink for forming a protective layer;

an obtaining section configured to obtain information regarding a shape of a print medium; and a controller, wherein the controller is configured to execute an ink amount increasing processing by controlling a discharging operation of the discharging head so as to increase an amount per unit area of the at least one ink with respect to a ridge line present area including a ridge line as a boundary between one print surface and the other print surface which are adjacent to each other in the print medium than another area different from the ridge line present area, based on the information regarding the shape of the print medium obtained by the obtaining section, and in the ink amount increasing processing, the controller is configured to control the discharging operation of the discharging head to make a size of the ridge line present area as an object of discharge by the discharging head greater and to make a thickness of the underlying layer and a thickness of the protective layer greater, as an angle defined by the one print surface and the other print surface is smaller.

2. The printing apparatus according to claim 1, wherein in the ink amount increasing processing, the controller is configured to control the discharging operation of the discharging head so as to increase a number of discharges with respect to the ridge line present area than a number of discharges with respect to the another area.

3. The printing apparatus according to claim 1, wherein in the ink amount increasing processing, the controller is configured to control the discharging operation of the discharging head so as to make a size of an ink droplet, of the at least one ink, to be discharged with respect to the ridge line present area larger than a size of an ink droplet, of the at least one ink, to be discharged with respect to the another area.

4. The printing apparatus according to claim 1, wherein in the ink amount increasing processing, the controller is configured to control the discharging operation of the discharging head so as to increase a number of passes with respect to the ridge line present area than a number of passes with respect to the another area.

5. The printing apparatus according to claim 1, wherein the protective layer ink is a clear ink.

6. The printing apparatus according to claim 1, wherein the base layer ink is a primer ink or a white ink.

7. A printing apparatus comprising:

a discharging head configured to discharge at least one ink among a printing ink of an ultraviolet curable type, a base layer ink for forming a base layer and a protective layer ink for forming a protective layer;

an obtaining section configured to obtain information regarding a shape of a print medium; and a controller, wherein the controller is configured to execute an ink amount increasing processing by controlling a discharging operation of the discharging head so as to increase an amount per unit area of the at least one ink with respect to a ridge line present area including a ridge line as a boundary between one print surface and the other print surface which are adjacent to each other in the print medium than another area different from the ridge line present area, based on the information regarding the shape of the print medium obtained by the obtaining section, and in the ink amount increasing processing, the controller is configured to control the discharging operation of the discharging head to make a size of the ridge line present area as an object of discharge by the discharging head smaller and to make a thickness of the underlying layer and a thickness of the protective layer greater, as the print medium is harder.

* * * * *